(No Model.)

C. HIRSCHMANN.
FISHERMAN'S APPLIANCE.

No. 520,052. Patented May 22, 1894.

Attest:
A. N. Jesbera
A. Kidder

Inventor:
Charles Hirschmann
by William B. Greeley
Att'y.

UNITED STATES PATENT OFFICE.

CHARLES HIRSCHMANN, OF NEW YORK, N. Y.

FISHERMAN'S APPLIANCE.

SPECIFICATION forming part of Letters Patent No. 520,052, dated May 22, 1894.

Application filed February 26, 1894. Serial No. 501,507. (No model.)

*To all whom it may concern:*

Be it known that I, CHARLES HIRSCHMANN, of New York, in the county and State of New York, have invented a new and useful Fisherman's Appliance; and I do hereby declare that the following is a full and exact description thereof, reference being had to the accompanying drawings, and to the letters of reference marked thereon, making a part of this specification.

Every fisherman who uses a hand line or pole and line experiences with more or less frequency the great annoyance of having his hook so firmly caught on some fixed object upon or near the bottom as to make it impossible to dislodge the same. Something must break before the line can be freed and usually the line itself breaks above the surface of the water because it is there dry and its fibers therefore more loosely laid than the portion below the surface. The consequence is that a greater or less length of the line is lost according to the depth of the water. No fisherman likes to lose a part of a good line in this way and the need of some means of dislodging the hook or at least causing the line to break near the hook is keenly felt. It is the object of my invention to supply this need and to provide a device which shall be thoroughly efficient for the purpose intended and yet shall be of such reasonable cost as to insure its being made a part of every fisherman's kit. Accordingly my invention consists in the device hereinafter described and claimed which is intended for the purpose referred to.

Figure 1:
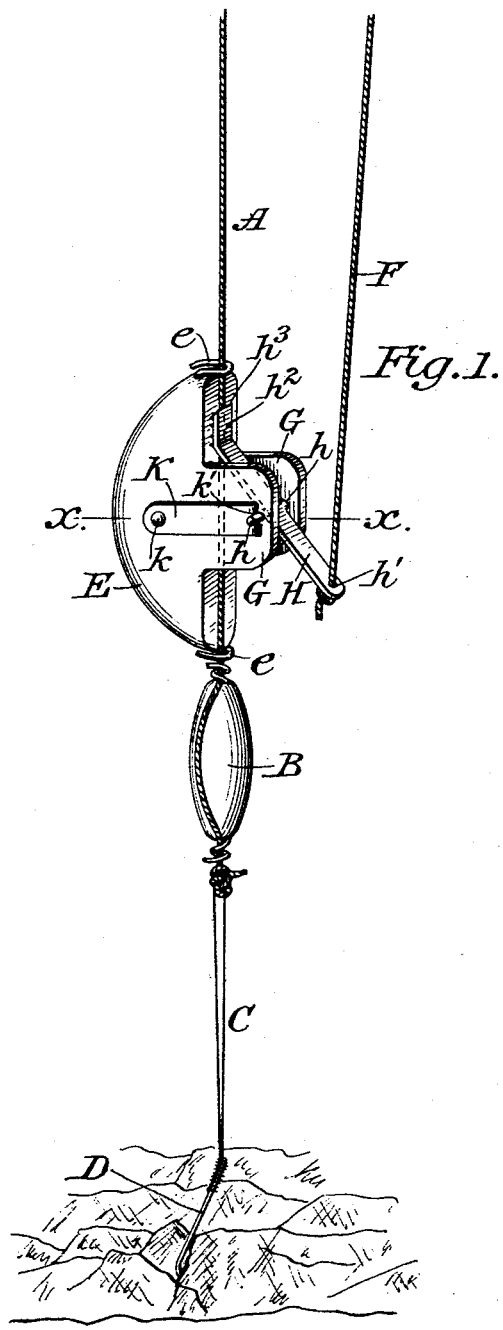
Figure 2:
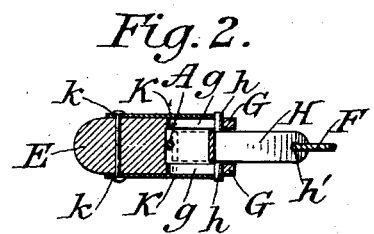
Figure 3:
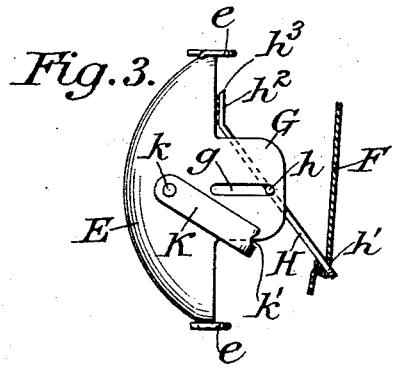

In the drawings: Figure 1 is a view in perspective showing the application of my device to a fish-line which has caught fast to the bottom by reason of the engagement of its hook. Fig. 2 is a section on the line $x$—$x$ of Fig. 1, and Fig. 3 is a side elevation of the device.

In Fig. 1 of the drawings a fish-line is represented at A as having a sinker B, a leader C and a hook D, and in position upon it, in readiness to assist or effect the disengagement of the line from the bottom, is shown my device E, having the supplementary line F attached thereto. The device E may be made in any desired shape and of any preferred material, and is conveniently made as a weighted body in the half-round form shown, being easily cast from lead in one piece. It is provided at each end with open eyes $e, e$, for its easy engagement with the line A and has upon its straight side the ears G, G, between which is pivoted the clamping bar H. The latter is preferably formed of a flat bar of stiff metal having pintles $h, h$, at its middle and having at one end an eye $h'$ while the other end is bent to form a clamping foot $h^2$. The bar H is so scured in place between the ears G, G, as to enable it to be removed easily in order to permit the line A to be introduced. A convenient arrangement for this purpose is that shown in the drawings wherein at least one of the ears G is slotted, as at $g$, to permit one pintle $h$ to be slipped down till the other can be withdrawn from its bearing. To hold the bar H in place when the device is in use a plate K is pivoted, as at $k$, in line with the slot $g$, and has at its free end a notch $k'$ which forms a bearing for the pintle $h$ and holds it in position. In practice I prefer that each bar G should have a slot $g$ and a pivoted plate K to permit the bar H to be more easily withdrawn and particularly to permit the bar to be placed either side out so that it can be used either as a clamp, as before stated, or to cut the line, the end of the foot $h^2$ being for this purpose formed with a cutting edge $h^3$ which comes into operative position only when the bar H is turned the other side out.

In the use of the device a strong line is attached to the eye $h'$ of the bar H and the device is then applied in the manner described to the line which has been caught fast. As the line F is slacked away the device descends until it strikes the sinker when the line F is drawn taut, which causes the foot $h^2$ to clamp the line A firmly against the straight side of the weighted body. A continued pull upon the line F will cause the hook D to give way or the line A to break between the hook and the device E. If for any reason it is so desired the bar H can be turned over before the application of the device to the line so that the line may be cut instead of being broken.

I claim as my invention—

1. The herein described device for saving fish-lines, the same comprising a weighted body having a straight side with open eyes to engage the fish-line at each end of the straight side and having ears upon said straight side between the ends, and a bar provided with a clamping foot at one end pivoted between said ears and adapted to have a second line attached to the other end, substantially as shown and described.

2. The herein described device for saving fish-lines, the same comprising a weighted body having eyes to engage the fish-line and having ears, one of which is slotted, a clamping bar having pintles to enter said ears, and means adapted to support one of said pintles in said slot and to be moved to permit said pintle to be moved in said slot, substantially as shown and described.

3. The herein described device for saving fish-lines, the same comprising a weighted body having eyes to engage the fish-line and having ears, one of which is slotted, a clamping bar having pintles to enter said ears, and a plate pivoted in line with said slot and adapted to support one of said pintles in said slot and to be moved aside to permit the pintle to be moved in the slot, substantially as shown and described.

4. The herein described device for saving fish-lines, the same comprising a weighted body having slotted ears, a bar having pintles to enter the slots in said ears and having one end bent to form a clamping foot with its end sharpened to form a knife and means adapted to support said pintles in said slots and to be moved to permit the bar to be removed and turned over, substantially as shown and described.

In testimony whereof I have signed my name to this specification in the presence of two subscribing witnesses.

CHARLES HIRSCHMANN.

Witnesses:
 W. B. GREELEY,
 A. N. JESBERA.